April 7, 1942.    M. B. MENTLEY    2,278,792
GEAR FINISHING MACHINE
Filed March 25, 1940    2 Sheets-Sheet 1
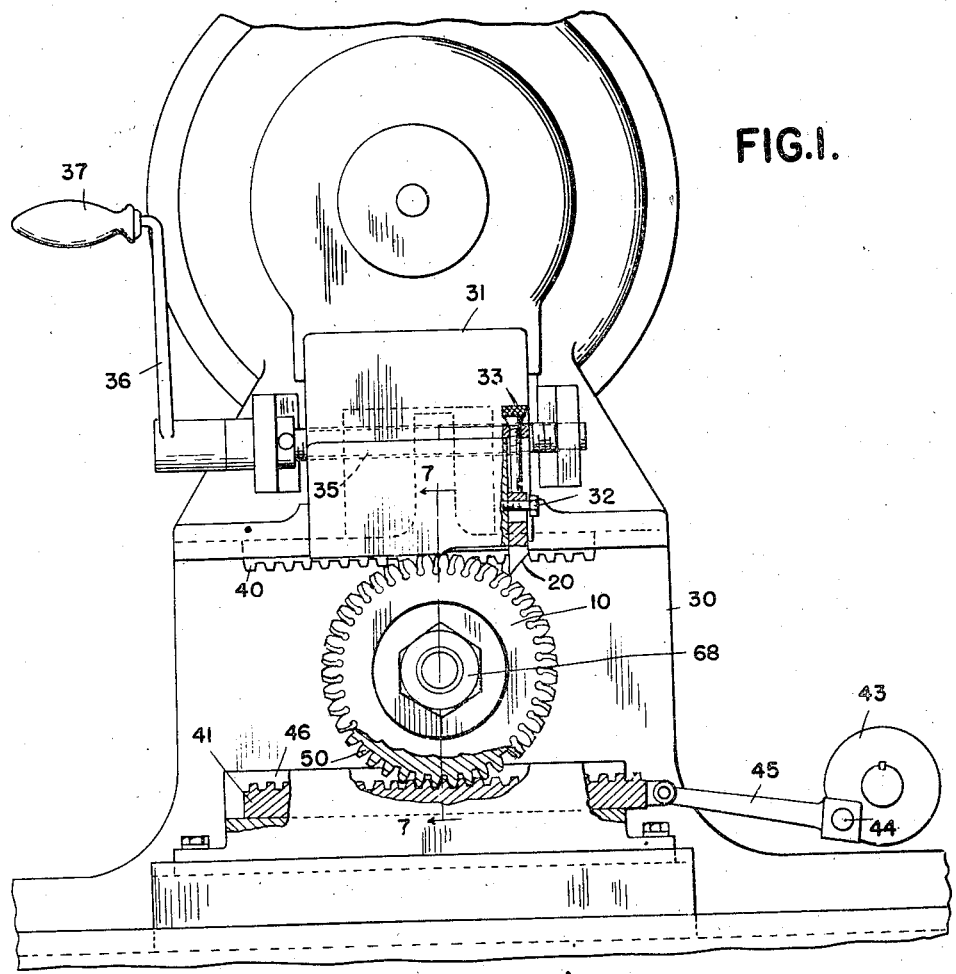
FIG.1.
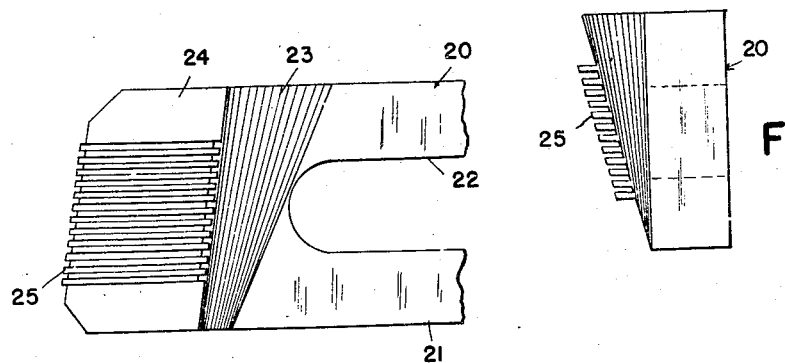
FIG.2.
FIG.3.
INVENTOR.
MAX B. MENTLEY
BY Whittemore, Hulbert
& Belknap   ATTORNEYS April 7, 1942.     M. B. MENTLEY     2,278,792
GEAR FINISHING MACHINE
Filed March 25, 1940     2 Sheets-Sheet 2
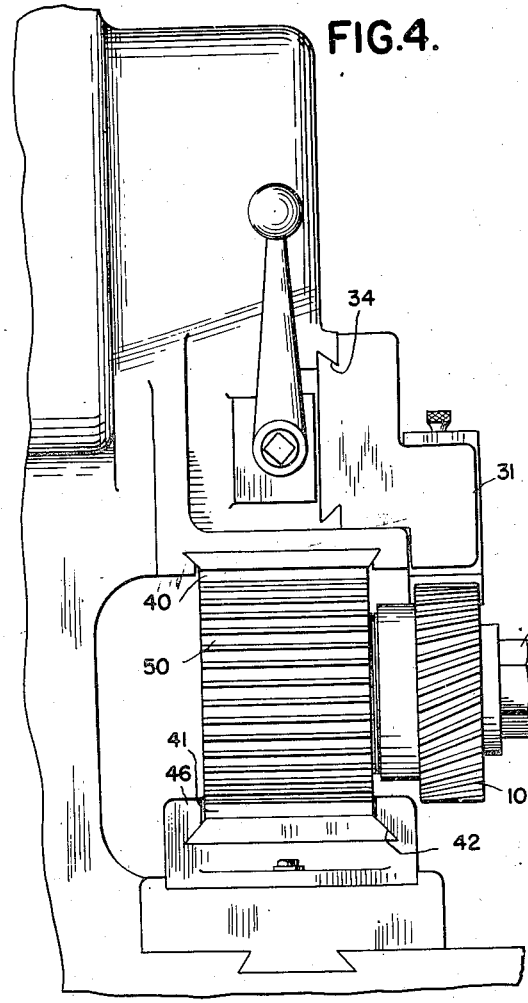
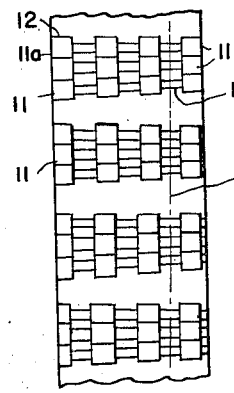
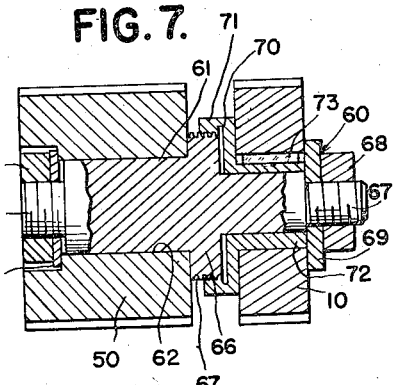
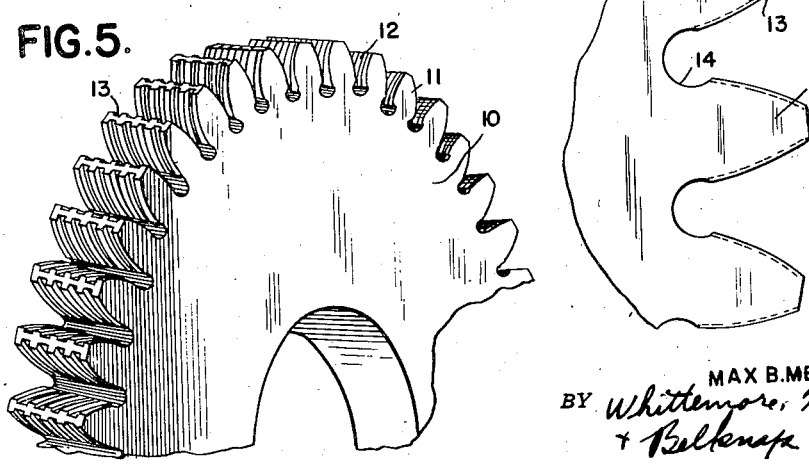
INVENTOR.
MAX B. MENTLEY
BY Whittemore, Hulbert
& Belknap ATTORNEYS Patented Apr. 7, 1942

2,278,792

UNITED STATES PATENT OFFICE 2,278,792

GEAR FINISHING MACHINE

Max B. Mentley, Detroit, Mich., assignor to National Broach & Machine Company, Detroit, Mich., a corporation of Michigan Application March 25, 1940, Serial No. 325,878

4 Claims. (Cl. 90—24)

The present invention relates to the art of gear finishing and more particularly to a novel gear cutter and apparatus for the manufacture thereof.

The shaving of roughed-out gears by running them in mesh at limited crossed axes with a shaving cutter has now come widely into use. In this operation the shaving cutter is made in the form of a gear conjugate to the gear to be finished by having its teeth extending at a different helix angle so that the gear and tool may be meshed with their axes crossed at a limited angle, preferably between 3° and 30°. One of the parts, either the gear or tool, is then positively rotated at relatively high speed while the other part is driven solely through the intermeshing engagement of the parts. In order to distribute the finishing action of the cutter from end to end of the gear teeth one of the parts is translated in a plane parallel to the axis of both the gear and the cutter and in a direction transverse to the axis of the cutter.

The shaving tool is provided with cutting edges which extend generally up and down the faces of the teeth. These cutting edges are preferably made by providing grooves or serrations in the face of the tool teeth and leaving the land surfaces intermediate the groove which serve to guide the tool relative to the work gear so as to produce thereon a surface conjugate to the tooth surface of the tool. Since these cutting edges are thus provided in a direction extending generally up and down the faces of the tool teeth it will be evident that their cutting action is essentially due to the cross sliding action introduced by the crossed axes setting. The involute rub, which as is well known varies from a minimum at the pitch line to a maximum at the top and bottom of the teeth, would by itself produce unequal cutting action. By providing the cutting edges generally parallel to the involute rub the cross sliding action referred to, which is uniform at all points on the teeth, is employed to produce uniform cutting.

The cutting edges provided by the grooves or serrations previously referred to are spaced apart a substantial distance so that without the relative translation between the tool and gear previously referred to the tool would cut separate scallops corresponding to each cutting edge and spaced apart a corresponding distance. This is for the reason that the contact between the teeth of the tool and the gear is in effect contact between two convex surfaces. Theoretically this contact is a point contact, although as a matter of practice it is effective over a considerable area. The meshed rotation of the tool and gear without the translation distributes this theoretical point contact up and down the face of the work gear. The relative translation referred to distributes the cut longitudinally of the teeth of the work gear, and since this feed is relatively slow the teeth of the work gear are finished uniformly and to a high degree of accuracy. In some cases, however, it is desired to finish teeth or parts of teeth with a very limited translation. Thus for example if it is desired to shave the ends of the gear teeth so as to impart a crowned effect to the teeth, this may be accomplished according to one method by translating the gear in a generally axial direction into one or a plurality of cutters presenting an off-lead condition. According to one method this may be accomplished by providing a crowning cutter having tapered teeth, that is the teeth may have a different lead on one side than on the other so that the teeth vary in thickness from end to end. If a gear is meshed with a cutter of this type so that the ends of its teeth are received within the wide ends of the teeth spaces of the tool and is then fed in a direction to cause the ends of its teeth to move further into the tooth spaces toward the narrow end of said spaces, the surfaces of the ends of the teeth will be removed thus providing crowned or partly crowned teeth on the work gear. Obviously under these conditions the amount of translation is strictly limited since the amount of crowning is a direct function of the amount of translation. If this crowning is limited sufficiently it may be that the crowned surfaces of the work gear teeth will not be finished uniformly, that is the serrations will form distinct marks on the tooth surface which will not be wiped out, as is the case when translation extends sufficiently to distribute the finishing action from end to end of the work gear teeth.

A similar result can of course be accomplished by providing a plurality of cutters which are themselves positioned with their axes at a slightly different angle to the axis of the work gear than the angle which would produce theoretically correct meshing action considering the differences in the helix angle of the gear and the cutter.

In either of the above mentioned circumstances and in certain other cases it is desirable to provide the serrations on successive teeth of the cutter out of alignment, or in other words to provide them such that without the relative translation referred to cutting edges of the successive teeth remove metal left by the preceding teeth. This can most conveniently be accomplished by providing the serrations with a slight lead around the cutter. Previously these serrations have been provided with no lead so that the corresponding serrations on all the teeth occupied a plane perpendicular to the axis of the cutter. According to the present invention these serrations may be arranged at such a lead that one rotation of the cutter advances the serration an amount equal to the width of a serration plus the width of the land surface intermediate the serrations. Of course if desired the land may be substantially greater.

With this arrangement of the serrations no translation is necessary to provide a smooth finishing action over the band of contact, however wide the band of contact may be. This same consideration gives certain advantages to this type of cutter even where the same is employed in the conventional manner, namely with full translation to distribute the finishing action from end to end. Accordingly, I wish it to be understood that I claim my improved cutter broadly, whether it is employed as a crowning cutter or as a conventional crossed axes shaving cutter.

With the foregoing remarks in view, it is an object of the present invention to provide a shaving cutter of the type referred to characterized by the provision of cutting edges such that a continuous series of cutting edges extend at a definite lead around the periphery of the cutter.

It is a further object of the present invention to provide cutters of the type described, characterized by the provision of serrations or grooves in the faces of the teeth of the cutter such that corresponding serrations on adjacent teeth are displaced axially from each other.

It is a further object of the present invention to provide cutters of the type described, characterized by the provision of serrations or grooves in the faces of the teeth of the cutter such that corresponding serrations on adjacent teeth are displaced axially by a definite amount.

It is a further object of the present invention to provide apparatus for serrating cutter teeth to produce serrations as described herein.

It is a further object of the present invention to provide a serrating machine characterized by means for rolling a cutter blank relative to a serrating tool to cut grooves or serrations in the faces of the cutter teeth in which combined indexing and feeding means are provided to produce a relative axial movement between the cutter blank and serrating tool during the indexing operation from tooth to tooth.

Other objects of the invention will be apparent as the description proceeds and when taken in conjunction with the accompanying drawings wherein:

Figure 1 is a front elevation partly in section of a machine for serrating cutter teeth;

Figure 2 is a fragmentary front elevation of a serrating tool;

Figure 3 is an end view of a serrating tool;

Figure 4 is a side elevation of my improved serrating machine;

Figure 5 is a fragmentary perspective of a gear cutter of the type referred to herein;

Figure 6 is a fragmentary enlarged side elevation of a gear cutter of the type referred to herein;

Figure 7 is a fragmentary section on the line 7—7 of Figure 1; and

Figure 8 is a diagrammatic view illustrating the arrangement of the serrations.

Referring first to Figures 5, 6 and 8 I have illustrated therein a cutter of the type referred to. This cutter comprises a blank 10 in the form of a gear having teeth 11 which are preferably involute teeth and which are provided with side surfaces or faces 12 having cutting edges formed thereon by the intersection of the faces of the teeth with the grooves or serrations 13. The surface of the teeth intermediate the grooves is not cut and forms guiding lands as previously mentioned. As best seen in Figure 6, the teeth 11 are undercut as indicated at 14 to provide channels for chip and oil clearance. The bottom of the serrations or grooves 13 is indicated in this figure in dotted line.

Referring now to Figure 8, I illustrate the arrangement of the serrations. Figure 8 may be considered as a developed view showing a series of teeth of a cutter of the type shown in Figure 5. In this figure the teeth 11 have the side surfaces 12 in which are provided the grooves or serrations 13. I have indicated corresponding serrations on adjacent teeth as displaced axially of the tool so that a line, such as the line 15, drawn through corresponding serrations on adjacent teeth extends in the developed view at an angle to the end surface of the cutter blank. It will be appreciated that the line 15 which extends at an angle in the developed view would have a helix angle or lead with respect to the actual cutter.

In Figure 8 I have also illustrated the teeth 11 as tapered, being thicker at the end 11a and narrower at the end 11b. While in this figure the teeth are shown as substantially spur teeth, it will be appreciated that the same condition would hold equally well for helical teeth. Thus in Figure 8 one side surface of the tooth 11 extends at a right-hand helix and the opposite surface of the same tooth extends at a left-hand helix. If the tooth were generally helical, one side surface would extend at a slightly larger lead than the other side, the average of the two being what may be termed the general helix angle of the cutter. Cutters of this type, that is having tapered teeth, are referred to in the crowning method mentioned above.

The grooves or serrations 13 may conveniently be provided in the teeth of the cutter by means of a tool 20 illustrated in Figures 2 and 3. This tool 20 comprises a main body 21 having an elongated slot 22 therein for a purpose which will subsequently appear. The lower portion of the tool 20 is formed at a skew angle to the main body 21 as indicated at 23 and terminates in a blade 24 having a plurality of ribs 25 thereon. The ribs 25 at their lower ends are sharpened to provide cutting edges.

The tool is employed in apparatus which provides a relative generating motion between the tool and the cutter and causes the cutting ribs 25 to approximately follow the profiles of the cutter teeth and to form the grooves or serrations 13 therein.

An apparatus for carrying out this function is illustrated in Figures 1, 4 and 7 and comprises generally a frame 30 having a tool supporting and feeding fixture 31 thereon. This tool supporting fixture includes a lock bolt 32 adapted to clamp the cutting tool 20 in adjusted position and a screw 33 for assisting in locking the tool in adjusted position. The tool support 31 is mounted for adjustment in suitable ways 34, and a feed screw 35 is provided, actuated by a crank 36 having a handle 37 thereon. The frame of the machine is provided with an upper rack 40 which is locked in place by suitable means (not shown) and a lower rack 41 which is mounted for reciprocation in suitable guiding ways 42. Means are provided for reciprocating the lower rack 41, and in Figure 1 I have illustrated these means as taking the form of a rotary member 43 having a crank 44 thereon connected by a connecting rod 45 to the lower rack 41.

As best seen in Figure 4, I provide a relatively wide gear 50 which is in mesh with both the upper rack 40 and the lower rack 41. The diameter of the gear 50 is selected with reference to the tool 10 to be serrated, and preferably the pitch diameter of the gear 50 is equal to or approximates the pitch diameter of the tool 10.

It will be apparent from Figure 1 that rotation of the member 43 causes the gear 50 to roll upon the upper rack 40, the lower rack 41 serving merely as means for thus rolling the gear 50.

The gear 50, as best seen in Figure 7, has extending therefrom a fixture 60 which provides for simultaneous, axial adjustment and indexing of the tool 10. As illustrated in this figure the fixture 60 comprises a member 61 received within a central bore 62 of the gear 50, and is herein illustrated as locked in place therein by means of a nut 63 and washer 64 cooperating with a suitably threaded stud 65 on the member 61. A radially extending flange 66 is formed on the member 61 and is provided with threads 67 which have the desired lead to be reproduced by the serrations on the teeth of the tool 10. An adapter 70 having an internally threaded flange 71, which is in threaded relation to the threads 67 previously referred to, is provided. The adapter 70 has a reduced portion 72 which receives the tool 10, and if desired this portion may be provided with a key-way 73 so as to insure against relative rotation between the tool 10 and the adapter 70.

The member 61 is threaded as indicated at 67 and a clamping nut 68 and washer 69 are provided. It will be evident that when the nut 68 is tightened the adapter 70 will be held against rotation on the member 62 and in addition the tool 10 will be rigidly clamped in position on the adapter 70.

Referring now to Figure 1, it will be seen that the serrating tool 20 is positioned as shown. Rolling motion of the cutter or tool 10, which is caused by reciprocation of the lower rack 41, will cause a rolling generating motion between the tool 10 and the serrating tool 20. During this relative generating motion the serrating tool 20 may be fed to the left inwardly of the tooth upon which it is acting by proper rotation of the crank 36.

In order to index the tool 10 from tooth to tooth, the nut 68 is loosened and the tool 10 is manually turned an amount sufficient to bring the next tooth thereon into operating position relative to the serrating tool 20. Since the tool 10 is locked against rotation on the adapter 70, this rotation provides for a corresponding rotation of the adapter 70 and the member 61. Each indexing step produces an axial movement of the tool 10 relative to the serrating tool 20. As soon as the tool 10 has been indexed a single tooth the clamping nut 68 is again tightened up and the serrating operation carried out as previously defined.

Obviously the lead which is imparted to the serrations will depend upon the lead of the threads 67 and this may be as great or small as desired, although preferably the lead should not be less than the width of a serration 13 and an adjacent land.

It will be evident that when the tool 10 has been completely serrated the tool 10 will have advanced axially by the amount of the lead of the threads 67.

In some cases, as for example where tools 10 having a very high helix angle are being serrated, it will be impossible to cut all of the serrations in one tooth surface simultaneously. Where this is the case, a lesser number of ribs 25 on the serrating tool 20 may be provided and the serrations extended from end to end of all of the teeth of the tool 10 by employing the present machine. Thus for example if a single rib 25 were provided on the serrating tool 20 it would be necessary to provide for as many complete rotations of the tool 10 during the serrating operation as there are numbers of serrations to be provided in each tooth.

As will be evident, production of gear cutters by the above mentioned apparatus will provide end lands of varying width. I have found that it is undesirable to have the end land of less than a certain predetermined width, and accordingly after the serrating operation has been completed I preferably remove by any suitable operation end lands having less than the minimum desired width.

It may be mentioned at this time that the relatively wide gear 50 which meshes with the upper rack 40 and lower rack 41 is held against axial shifting during the operation, and in Figure 4 I have illustrated flanges 46.

While I have illustrated a single preferred form of apparatus and have described only a single modification of cutter, it will be understood that this has been done to enable those skilled in the art to practice the invention the scope of which is indicated by the appended claims.

What I claim as my invention is:

1. A serrating machine for gear teeth comprising a work support for a gear-like work piece, a tool support for a serrating tool, means for providing a relative rolling generating motion between said work support and said tool support, means on said work support for indexing said work gear, and means effective upon indexing of said work gear to move said work gear axially by a predetermined amount.

2. A serrating machine comprising a tool support, a work support, means for rolling said work support relative to said tool support, a fixture threaded to said work support for directly supporting a work piece, and clamping means for locking said fixture against rotation, whereby indexing rotation of said fixture results in axial advance thereof.

3. In a serrating machine having a tool support, a base roll, a guiding member against which said base roll rolls, said base roll having an axial threaded projection, an adapter threaded to said projection and adapted to support a work gear, and releasable means clamping said adapter to said projection in any position of rotation.

4. In a serrating machine having a tool support, a base roll, a guiding member against which said base roll rolls, said base roll having an axial threaded projection, an adapter threaded to said projection and adapted to support a work gear, and a nut threaded to said projection beyond said adapter and adapted to clamp a work piece to said adapter and said adapter to said projection.

MAX B. MENTLEY.